United States Patent
Araki

(10) Patent No.: US 9,074,679 B2
(45) Date of Patent: Jul. 7, 2015

(54) LUBRICATING OIL COLLECTING AND GUIDING DEVICE

(75) Inventor: Kenichi Araki, Hiroshima (JP)

(73) Assignee: NIFCO INC., Yokohama-Shi, Kanagawa (JP)

( * ) Notice: Subject to any disclaimer, the term of this patent is extended or adjusted under 35 U.S.C. 154(b) by 389 days.

(21) Appl. No.: 13/387,179

(22) PCT Filed: Jul. 27, 2010

(86) PCT No.: PCT/JP2010/062583
§ 371 (c)(1),
(2), (4) Date: Feb. 23, 2012

(87) PCT Pub. No.: WO2011/013647
PCT Pub. Date: Feb. 3, 2011

(65) Prior Publication Data
US 2012/0145483 A1    Jun. 14, 2012

(30) Foreign Application Priority Data
Jul. 27, 2009    (JP) ................. 2009-174151

(51) Int. Cl.
*F16H 57/04*    (2010.01)
*F16B 21/08*    (2006.01)

(52) U.S. Cl.
CPC ........... *F16H 57/0423* (2013.01); *F16B 21/084* (2013.01); *F16H 57/0457* (2013.01); *F16H 57/0494* (2013.01)

(58) Field of Classification Search
CPC .................................. F16H 57/0423
USPC .............................. 184/6.12, 11.2
IPC .............................. F16H 57/04,57/02
See application file for complete search history.

(56) References Cited

U.S. PATENT DOCUMENTS 6,223,858 B1 *  5/2001  Ubagai et al. ................. 184/11.2
2006/0065487 A1 *  3/2006  Tominaga et al. ........... 184/6.12

FOREIGN PATENT DOCUMENTS

GB    2 166 816 A    5/1986
JP    S57-140965    8/1982
JP    S62-20257    2/1987

(Continued)

OTHER PUBLICATIONS

JP2001355715 English Translation.pdf.*

(Continued)

*Primary Examiner* — William E Dondero
*Assistant Examiner* — Minh Truong
(74) *Attorney, Agent, or Firm* — Manabu Kanesaka

(57) ABSTRACT

An oil path (9) as a lubricating oil collecting and guiding device is provided with a long gutter-shaped main unit (9A), a press-in pin part (21) pushed into a press-in hole (22) formed on an open side end face (4a) of a transmission case (4), and an insertion pin part (24) inserted into an insertion hole (25) formed on a bottom part side of the transmission case (4). By this, the operation of installation on the bottom part side of the transmission case (4) during installation of the oil path (9) on the transmission case (4) includes only inserting the insertion pin part (24) into the insertion hole (25) of the transmission case (25), the operator therefore no longer needs to insert a hand deeply inside the transmission case (4) for the operation, and the operability of installation of the oil path (9) on the transmission case is improved.

7 Claims, 6 Drawing Sheets

(56) References Cited

FOREIGN PATENT DOCUMENTS

| JP | H01-279166   | 9/1989  |
|----|--------------|---------|
| JP | H01-279166 A | 11/1989 |
| JP | H09-210185 A | 8/1997  |
| JP | H09-210185   | 12/1997 |
| JP | H11-093923   | 4/1999  |
| JP | 2001-355715  | 12/2001 |
| JP | 2001-355715 A | 12/2001 |
| JP | 2002-054729  | 2/2002  |
| JP | 2003-329113  | 11/2003 |
| JP | 2004-084405  | 3/2004  |

OTHER PUBLICATIONS

European Patent Office, "Supplementary European Search Report for EP 10 80 4393", Dec. 11, 2012.

* cited by examiner

1

LUBRICATING OIL COLLECTING AND GUIDING DEVICE

TECHNOLOGICAL FIELD

The present invention relates to a lubricating oil collecting and guiding device for collecting lubricating oil inside a transmission case and guiding the collected lubricating oil to parts to be lubricated inside the transmission case.

BACKGROUND TECHNOLOGY

Oil paths are widely used as lubricating oil collecting and guiding devices in transmission cases. An oil path generally has a comparatively long gutter shape, and the oil path is placed on a side above a series of transmission gears inside the transmission case with an open side thereof being oriented upward, as illustrated in Patent Document 1. By this, one end side of the oil path comes to collect lubricating oil thrown up by the gears inside the transmission case, and the lubricating oil is supplied to prescribed lubricated parts using the gutter shape (channel) of the oil path.

Incidentally, because the oil path is comparatively long as mentioned above, the oil path is normally held at a plurality of places on the transmission case when placed inside the transmission case. Specifically, in Patent Document 1, an insertion projection (reference numeral 44 in Patent Document 1) is provided on one end side of the oil path, and the insertion projection is inserted into an insertion hole formed on an open side end face of the transmission case. Meanwhile, on another end side of the oil path, a push-in-type locking piece (press-in projection) is pushed into an installation hole provided on a bottom part of the transmission case.

PRIOR ART DOCUMENTS

Patent Documents

Japanese Patent Application Disclosure Publication No. 2002-54729

OUTLINE OF THE INVENTION

Problem to be Solved by the Invention

However, in the case of an installation structure as described above, a push-in-type locking piece on another end side of the oil path is pushed into the installation hole on a bottom part side of the transmission case, and a pressing force must be applied to a portion near the locking piece on the oil path at that time. Because the operator must insert a hand inside the narrow transmission case where the series of transmission gears are received for the purpose of that pressing operation, this becomes a cause of degradation of operability of the operation of installation of the oil path.

The present invention was created in consideration of circumstances such as the above, and a technical problem thereof is to provide a lubricating oil collecting and guiding device in. which the operability of installation onto the transmission case can be improved.

Means for Solving the Problem

In order to solve the abovementioned problem, the present invention is a lubricating oil collecting and guiding device for collecting lubricating oil inside a transmission case and guiding the collected lubricating oil to lubricated parts inside the transmission case, wherein the device includes a long gutter-shaped main unit and a plurality of held parts provided on the main unit. The main unit is placed above a serial gear group received inside the bottomed cylindrical transmission case when the plurality of held parts is held on the transmission case. A first held part of the plurality of held parts is held in a tightly fitted state by a holding part formed on an open side end face of the transmission case. A second held part of the plurality of held parts excluding the first held part is held in a loosely fitted state by a holding part for fixing in position formed on a bottom part side of the transmission case.

According to such lubricating oil collecting and guiding device, when installing the lubricating oil collecting and guiding device inside the transmission case, it is sufficient to adjust the position of the second held part using the lubricating oil collecting and guiding device, and to allow the second held part held in a loosely fitted state without a press-in operation by the holding part formed for fixing in position on the bottom side of the transmission case. Accordingly, the operator no longer needs to insert a hand to the depth inside the transmission case to perform a press-in operation (operation involving a push-in operation). Also, although the operation for allowing the first held part held by the holding part formed on the open side end face of the transmission case involves a press-in operation, the operation can be performed easily because the space near the opening of the transmission case serves as the operating space. Accordingly, the lubricating oil collecting and guiding device of the present invention is excellent in the operability of installation on the transmission case.

In the lubricating oil collecting and guiding device of the present invention, the holding part formed on the open side end face of the transmission case may be a press-in hole; the first held part may be a press-in projection pressed into the press-in hole; the holding part formed for fixing in position on the bottom part side of the transmission case may be an insertion hole; and the second held part may be an insertion projection freely inserted into the insertion hole.

Also, in the lubricating oil collecting and guiding device of the present invention, a length of projection of the insertion projection from the main unit preferably is longer than a length of projection of the press-in projection from the main unit, and an insertion length of the insertion projection into the insertion hole preferably is longer than an insertion length of the press-in projection into the press-in hole in the installed state.

By this, the insertion projection is inserted into the insertion hole before the press-in projection is pressed into the press-in hole during the installation operation, whereby the main unit is partially fixed in position on the transmission case by the insertion projection inserted into the insertion hole, and the press-in operation (push-in operation) of the press-in projection into the press-in hole can therefore be performed more exactly and easily.

Also, in the lubricating oil collecting and guiding device of the present invention, a support part preferably is provided on one end side in a long direction of the main unit to extend outward to the side of the main unit; and the first held part is provided on the support part.

By this, the press-in force can be transmitted appropriately to the first held part by the support part, and the press-in operation (push-in operation) of the first held part can be performed more exactly and easily.

Also, in the lubricating oil collecting and guiding device of the present invention, a back face of the support part preferably is formed to align in one plane with one end of the main unit.

By this, processing of the junction face of the clutch case becomes easier, and when the open end face of the transmission face and the junction end face of the clutch face are joined together, the clutch case is placed on the back face side of the support part, and the like, whereby the clutch case can be used as means for restricting movement of the support part, and the like.

Also, in the lubricating oil collecting and guiding device of the present invention, the press-in projection preferably has a brush clip shape. By this, the press-in projection is more easily pressed into the press-in hole, and the press-in projection pressed into the press-in hole is held firmly on the transmission case.

EMBODIMENTS OF THE INVENTION

Embodiments of the present invention are described below based on the drawings.

Figure 1:
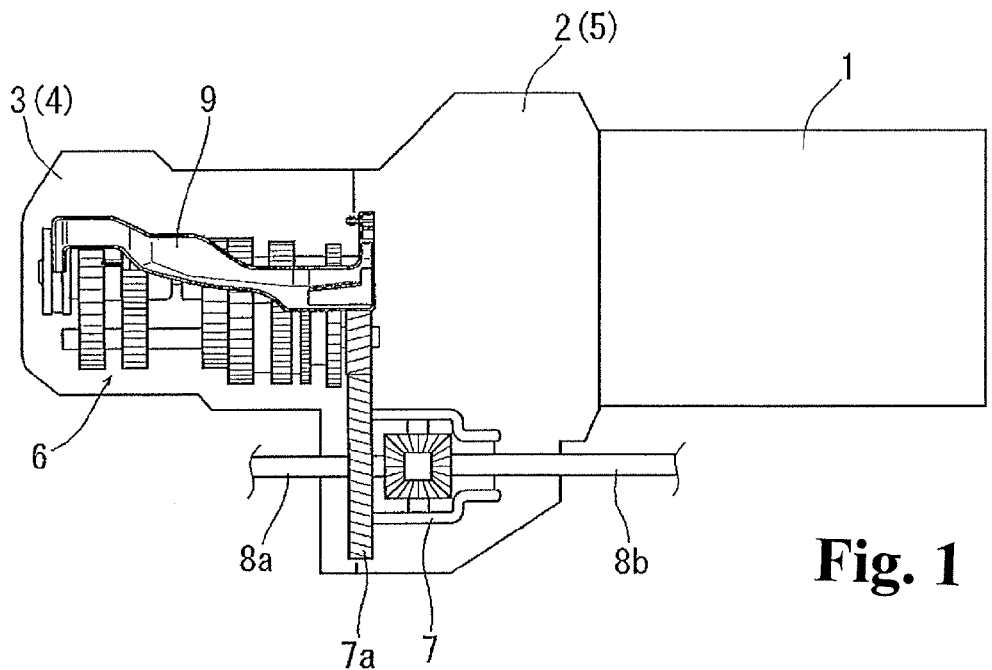
FIG. 1 is a diagram illustrating a transmission, and the like, in which an oil path 9 according to one embodiment of the present invention is used.
Figure 2:
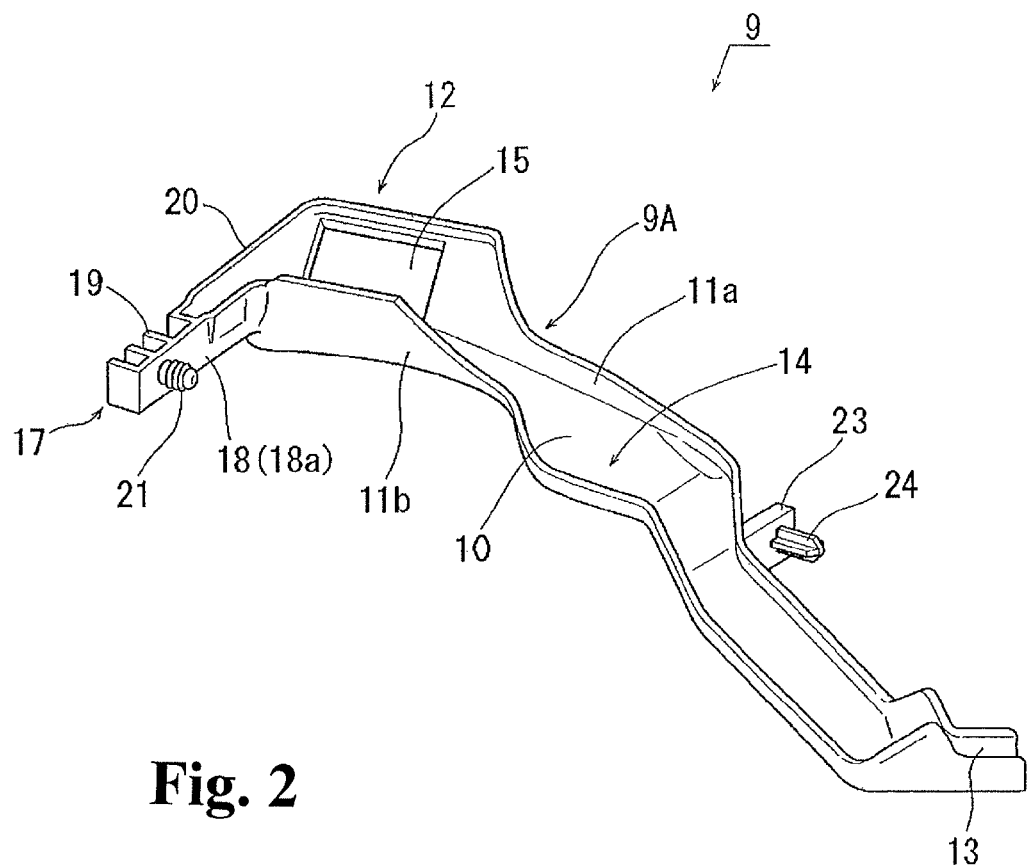
FIG. 2 is a perspective view illustrating the oil path 9 according to one embodiment of the present invention.
Figure 3:
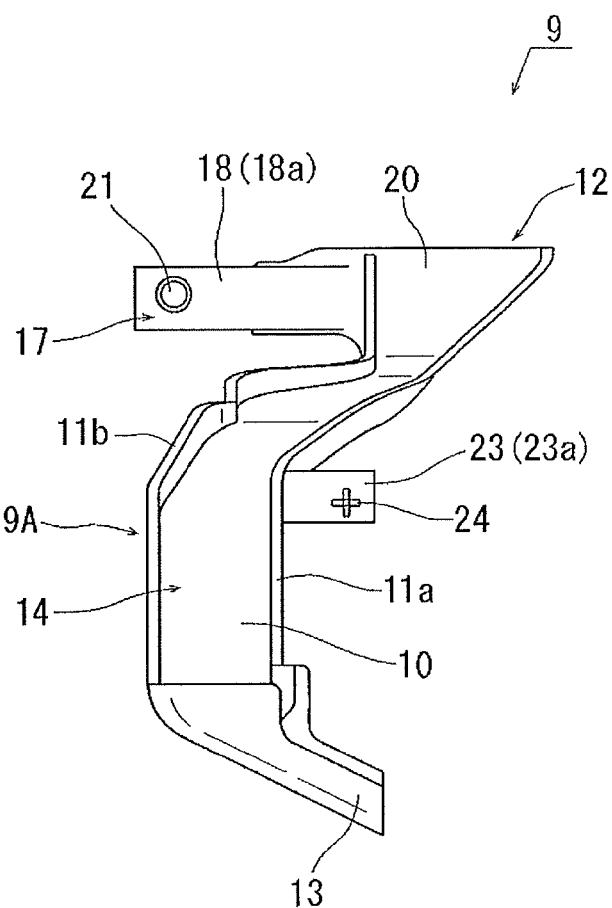
FIG. 3 is a front view illustrating the oil path 9 according to one embodiment of the present invention.
Figure 4:
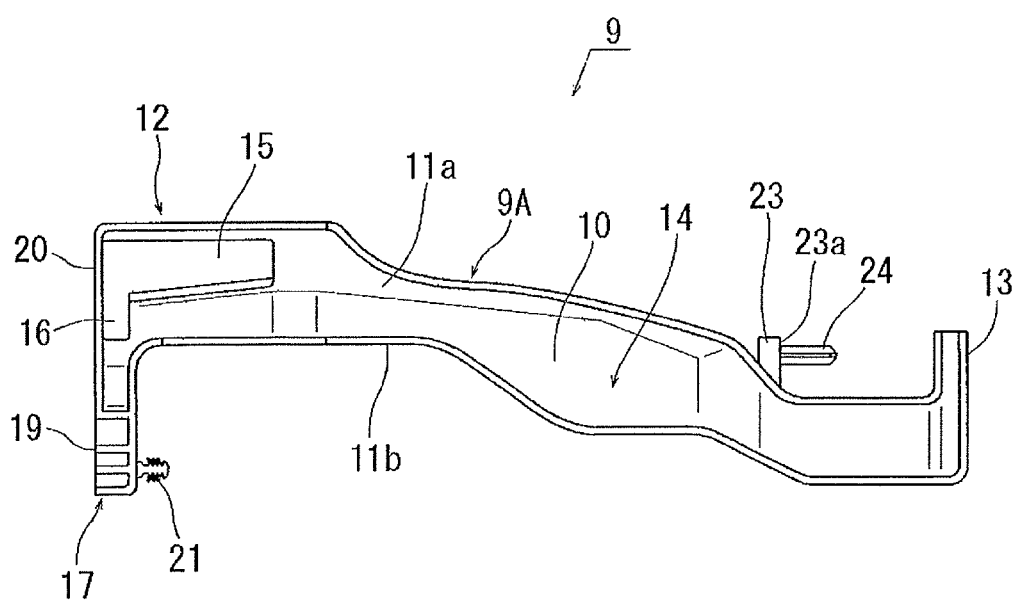
FIG. 4 is a plan view illustrating the oil path 9 according to one embodiment of the present invention.
Figure 5:
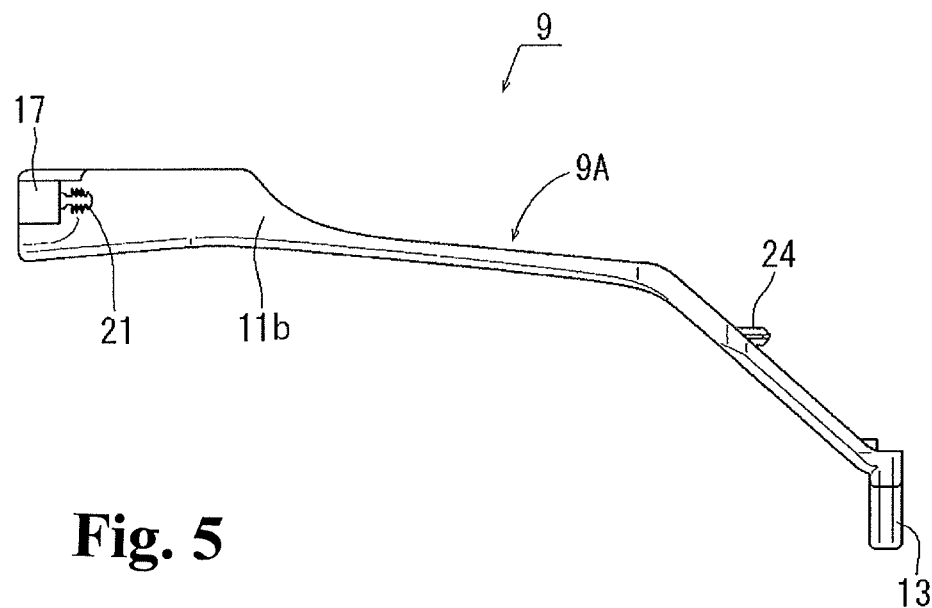
FIG. 5 is a left side view illustrating the oil path 9 according to one embodiment of the present invention.

FIGS. 1 to 8 illustrate an oil path 9 according to one embodiment of the present invention. In FIG. 1, reference numeral 1 indicates an engine, reference numeral 2 indicates a clutch, and reference numeral 3 indicates a transmission. The transmission 3 has a bottomed cylindrical transmission case 4, and an open side end face 4a thereof is joined to a junction end face 5a of a clutch case 5 of the clutch 2. A serial gear group 6 is received inside the transmission case 4, the output of the engine 1 is adjusted by the serial gear group 6, and the adjusted output is transmitted to left and right drive shafts 8a and 8b via a differential gear 7.

An oil path 9, as one embodiment of the lubricating oil collecting and guiding device of the present invention, is placed inside the transmission case 4. The oil path 9 is formed, for example, with 6-6 nylon or other resin, and is positioned inside the transmission case 4, above the serial gear group 6 inside the transmission case 4, as illustrated in FIG. 1. One end side thereof is positioned on the open side of the transmission case 4, and another end side thereof is positioned on the bottom part side (left side in FIG. 1) of the transmission case 4.

Also, the oil path 9 has a long gutter-shaped main unit 9A as illustrated in FIGS. 2 to 6. The main unit 9A has a bottom wall part 10 and a pair of side wall parts 11a and 11b standing up from both sides in the width direction (long direction) thereof, and the upper side of the bottom wall part 10 is open. In the oil path 9 in this example, the bottom wall part 10 and the pair of side wall parts 11a and 11b on one end side in the long direction of the main unit 9A constitute a lubricating oil collecting part 12 for collecting lubricating oil stirred up inside the transmission case 4, the bottom wall part 10 and the pair of side wall parts 11a and 11b on another end side in the long direction of the main unit 9A constitute a flow-out part 13 for allowing the collected lubricating oil to flow down, and a groove-like portion formed by the bottom wall part 10 and the pair of side wall parts 11a and 11b between the one end side and another end side of the main unit 9A serves as a channel part 14 in which the collected lubricating oil flows.

In the oil path 9 in the present example, the space between the pair of side wall parts 11a and 11b becomes larger going away from the bottom wall part 10 in order to increase the efficiency of collection of lubricating oil by the lubricating oil collecting part 12. That is, the opening on the upper side of the bottom wall part 10 is widened outward in the width direction (left to right direction in FIG. 3) of the bottom wall part 10 going upward from the bottom wall part 10. Also, a comparatively large opening 15 is formed on one side wall part 11a. The opening 15 is provided in order to take in lubricating oil stirred up by a ring gear 7a of the differential gear 7 (see arrow in FIG. 6). Also, another end side of the oil path 9 is bent or curved downward, so that another end side becomes lower than the one end side of the oil path 9, in order to deliver the collected lubricating oil by gravity. Of course, the total length, total curved or bent shape, orientation of the flow-out part 13, channel incline, and the like, of the oil path 9 are suitably determined in accordance with the lubricated parts (gears, shaft bearings, and the like) intended for supply of lubricating oil.

In the oil path 9 in the present example, a part 10a near one end side of the bottom part 10 is formed as an inclined surface that becomes lower going toward one end of the bottom part 10. By this, a portion of the collected lubricating oil also flows out to the outside via the opening 15 and a cutout hole 16 provided continuing on the opening 15 toward one end side of the bottom part 10 from the opening 15 (see arrows in FIG. 6).

A first support part (support part) 17 is integrally provided on one end part in the long direction of the oil path 9 as illustrated in FIGS. 2 to 6. The first support part 17 extends outward to the side with a constant width (for example, about the same width as the width of a thumb) from the other side wall part 11b of the abovementioned pair of side wall parts 11a and 11b. Also, the first support part 17 is constituted with a strip-form flat board-form part 18 having a front face as a smooth surface, and lattice-form rib parts 19 (intersection of one row horizontally and four rows vertically) integrally provided on a back face side of the flat board-form part 18. The flat board-form part 18 stands up roughly perpendicularly on the other side wall part 11b with the smooth front face 18a facing another end side in the long direction of the oil path 9, and the lattice-form rib parts 19 have a height extending from the flat board-form part 18 to the one end in the long direction of the oil path 9 in order to increase the rigidity of the first support part 17.

In the present embodiment, the opening on one end of the oil path is screened by a screen board 20 (the bottom wall part 10 and the end faces of the pair of side wall parts 11a and 11b are joined with the screen board 20) in order to increase the bending rigidity of the cantilever-form first support part 17. The screen board 20 is elongated, and the elongated portion is connected to the lattice-form rib parts 19. At this time, the outer face of the screen board 20 and the upright end faces of the lattice-form rib parts 19 are on one plane.

Figure 6:
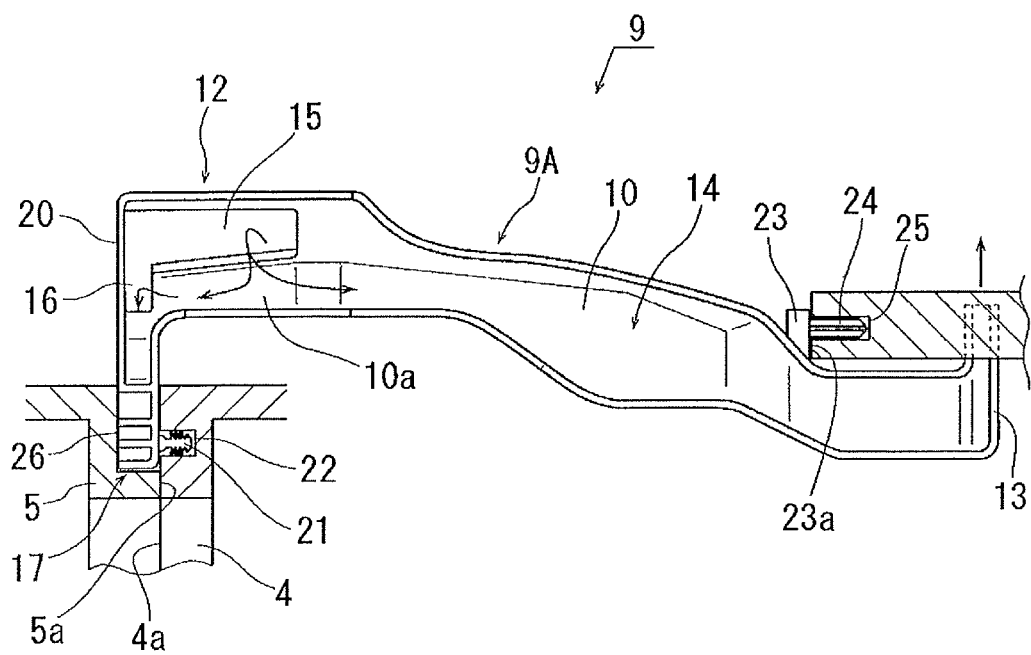
FIG. 6 is a diagram describing the state of installation of the oil path 9 according to one embodiment of the present invention in plan view.
Figure 7:
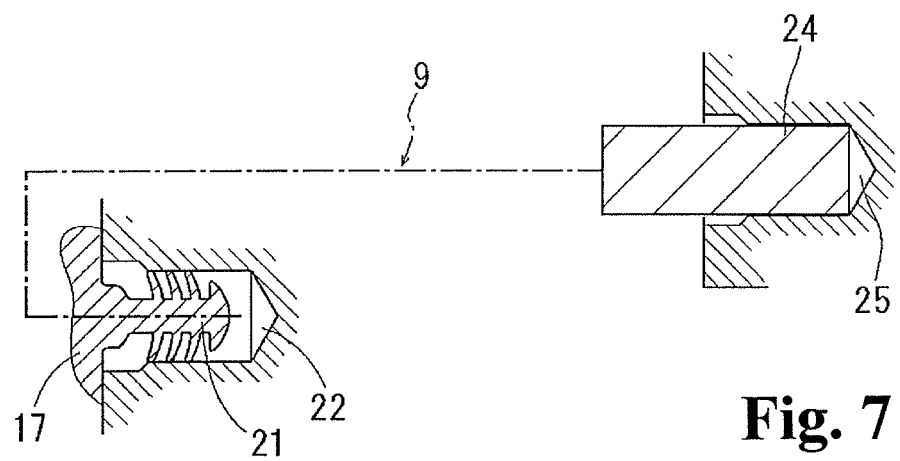
FIG. 7 is a diagram describing the state in which the oil path 9 according to one embodiment of the present invention is installed using an insertion pin part and a press-in pin part.

A press-in pin part (first held part, press-in projection) 21 is integrally provided on the front face 18a of the flat board-form part 18 on the first support part 17 as illustrated in FIGS. 2 to 6. The press-in pin part 21 is projected forward (toward the other end side in the long direction of the oil path 9) from the front face 18a of the flat board-form part 18. In the present embodiment, a brush-clip-shaped press-in pin part 21 is used, and the structure thereof, as is known, is such that a plurality of flexible wing parts is provided on the outer perimeter face of a shaft part following the direction of extension of the axis of the shaft part (see FIGS. 7 and 8). The press-in pin part 21 is pressed into and held in a tightly fitted state by a corresponding press-in hole (holding part 22) on the open side end face (flange part face or boss face) 4a of the transmission case 4, as illustrated in FIGS. 6 and 7. In the present example, the press-in pin part 21 is pressed into the press-in hole 22 until the front face 18a of the first support part 17 contacts the open side end face 4a of the transmission case 4. The press-in hole 22 is suitably determined with consideration of the position of placement, shape, and the like, of the oil path 9.

A second support part 23 is integrally provided on another end side in the long direction of the oil path 9 as illustrated in FIGS. 2 to 6. The second support part 23 is extended outward to the side with a prescribed width from the one side wall part 11a, and the second support part 23 is formed so that a smooth front face 23a thereof faces another end side in the long direction of the oil path 9. An insertion pin part (second held part, insertion projection) 24 is integrally provided on the front face 23a of the second support part 23. The insertion pin part 24 is projected from the front face 23a of the second support part 23 toward another end side in the long direction of the oil path 9. In the present embodiment, an insertion pin part 24 having a cross form viewed from the leading end of the insertion pin part 24 is used. The insertion pin part 24 is inserted (non-pressing-in operation or placement operation) inside a corresponding insertion hole (holding part) 25 opened on the inner wall on the bottom part side (a raised portion of the bottom part, or the like) of the transmission case 4, and is held in a loosely fitted state in the insertion hole 25, as illustrated in FIGS. 6 and 7. The insertion pin can be inserted into the insertion hole 25 with a much smaller force compared with pressing of the press-in pin part 21 into the press-in hole 22. The insertion hole 25 is suitably determined with consideration of the position of placement, shape, and the like, or the oil path 9, just as with the previously described press-in pin part 21. Also, in the present embodiment, the insertion pin part 24 is inserted until the front face 23a of the second support part 23 contacts the other end face of the insertion hole 25 in the transmission case 4, but the invention is not limited to this.

Figure 8:
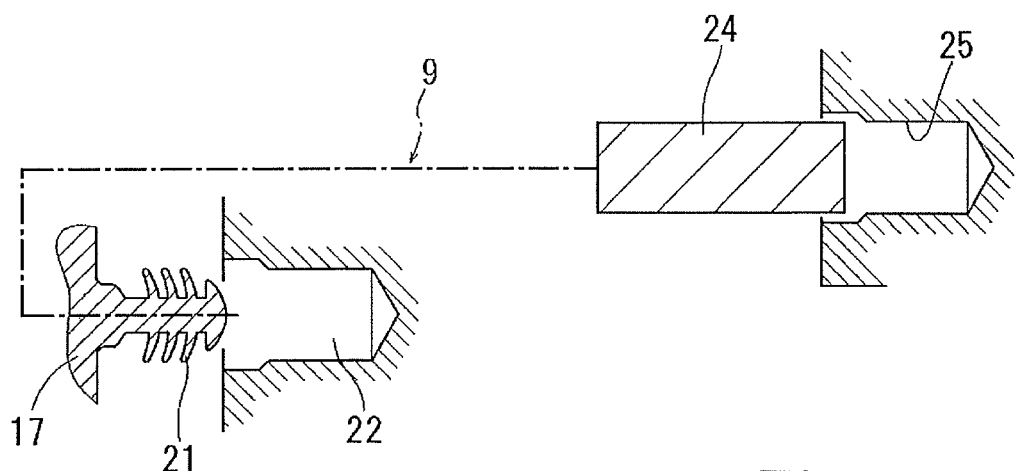
FIG. 8 is a diagram describing the state during the operation of installation of the insertion pin part and the press-in pin part of the oil path 9 according to one embodiment of the present invention.

Also, the length of projection (length of projection from the front face 23a of the second support part 23) of the insertion pin part 24 is set longer than the length of projection (length of projection from the front face 18a of the first support part 17) of the press-in pin part 21 as illustrated in FIGS. 2, 4, and 5 to 7, and the insertion length of the insertion pin part 24 into the insertion hole 25 is longer than the insertion length of the press-in pin part 21 into the press-in hole 22 in the correctly installed state of the oil path 9 (see FIG. 7). Therefore, during the installation operation, the insertion pin part 24 first begins insertion into the insertion hole 25 before the press-in pin part 21 is pressed into the press-in hole 22 as illustrated in FIG. 8, fixing in position is accomplished based on the insertion of the insertion pin part 24 into the insertion hole 25, and pressing of the press-in pin part 21 into the press-in hole 22 is simplified.

A recess 26 is formed on the junction end face 5a of the clutch case 5 on a portion where the first support part 17 installed on the transmission case 4 is positioned. Therefore, the first support part 17 is received inside the recess 26 of the clutch case 5 joining the open side end face 4a of the transmission case 4 and the junction end face 5a of the clutch case 5, the bottom face of the recess 26 becomes in a position on the base face side (left side in FIG. 6) of the first support part 17, and movement of the first support part 17 to the back face side is restricted by the bottom face of the recess 26 of the clutch case 5. The press-in pin part 21, and the like, can thereby be assuredly prevented from coming out from the press-in hole 22, and the like.

The operation of installation of the aforementioned oil path 9 is next described.

First, the operator takes the oil path 9 in hand and inserts the leading end side thereof (another end side in the long direction of the oil path 9) toward the bottom part side from the opening of the transmission case 4. Also, the operator inserts the insertion pin part 24 of the oil path 9 into the insertion hole 25 on the bottom part side of the transmission case 4. At this time, the operation includes only inserting the insertion pin part 24 into the insertion hole 25 using a light insertion force, there is no need to press the installed portion or the vicinity thereof toward the bottom part side of the case 4 as in the case of pressing, and the like, and the operator does not need to insert a hand inside the transmission case 4.

Next, the operator presses the press-in pin part 21 into the press-in hole 22 on the open side end face 4a of the transmission case 4 accompanying insertion of the insertion pin part 24 into the insertion hole 25. At this time, because the insertion pin part 24 is inserted into the insertion hole 25 before the press-in pin part 21 is pressed into the press-in hole 22 as illustrated in FIG. 8, and fixing in position is accomplished based on that, the press-in hole 22 into which the press-in pin part 21 is pressed can be found easily, and the press-in pin part 21 can be easily pressed into the press-in hole 22.

Also, in the press-in operation of the press-in pin part 21, because the rigidity of the first support part 17 is increased by the rib parts 19, and a pressing face having a size about the width of a thumb is assured on the first support part 17, the pressing force of a thumb, or the like, can be transmitted appropriately to the press-in pin part 21, and pressing of the press-in pin part 21 into the press-in hole 22 can be performed appropriately.

Moreover, in this case, because the press-in hole 22 is formed on the open side end face 4a of the transmission case 4, and a space for the press-in operation on the opposite side is formed as a free space, the press-in operation can be performed easily also from this viewpoint.

The junction end face 5a of the clutch case 5 and the open side end face of the transmission case 4 are joined together at completion of insertion of the insertion pin into the insertion hole 25 and pressing of the press-in pin part 21 into the press-in hole 22. At this time, the first support part 17 receives the recess 26 of the clutch case 5, and the first support part 17 is restricted from moving in a direction of coming out of the press-in pin part 21, and the like, by the junction of the clutch case 5 and the transmission case 4. As a result, the oil path 9 is held appropriately in a prescribed position inside the transmission case 4.

Accordingly, according to the oil path 9 of the present embodiment, the oil path 9 can be installed appropriately in the transmission case 4 without the operator inserting a hand deeply inside the transmission case 4 when installing inside the transmission case 4, and the operability of installation of the oil path 9 into the transmission case 4 is therefore improved.

Figure 9:
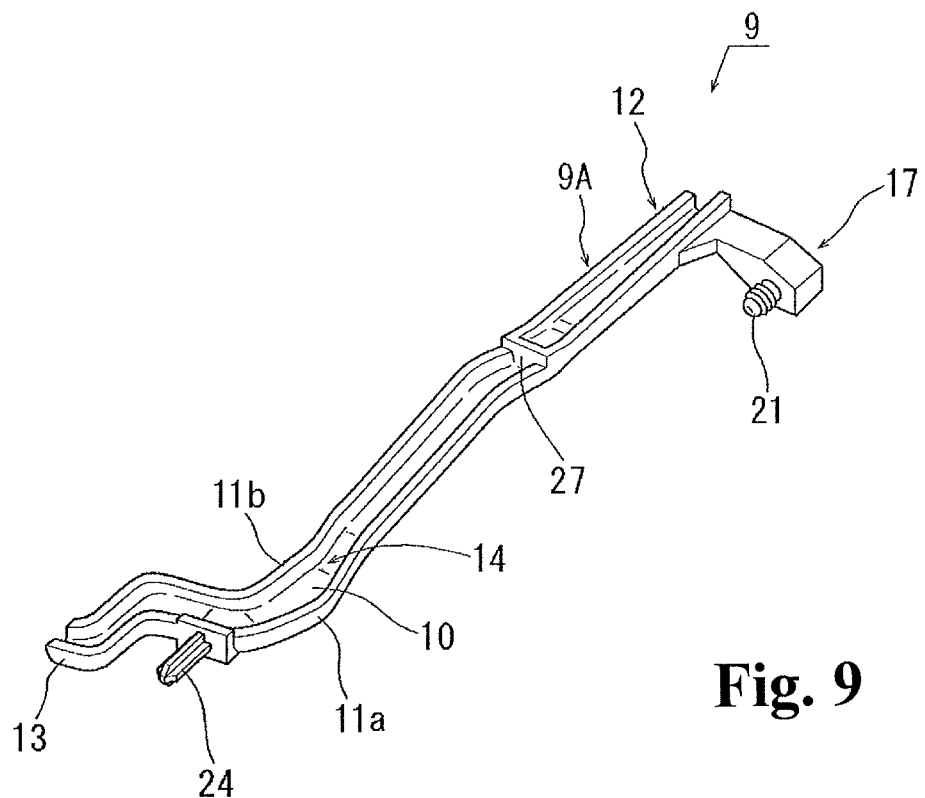
FIG. 9 is a perspective view illustrating a modified example of the oil path 9.
Figure 10:
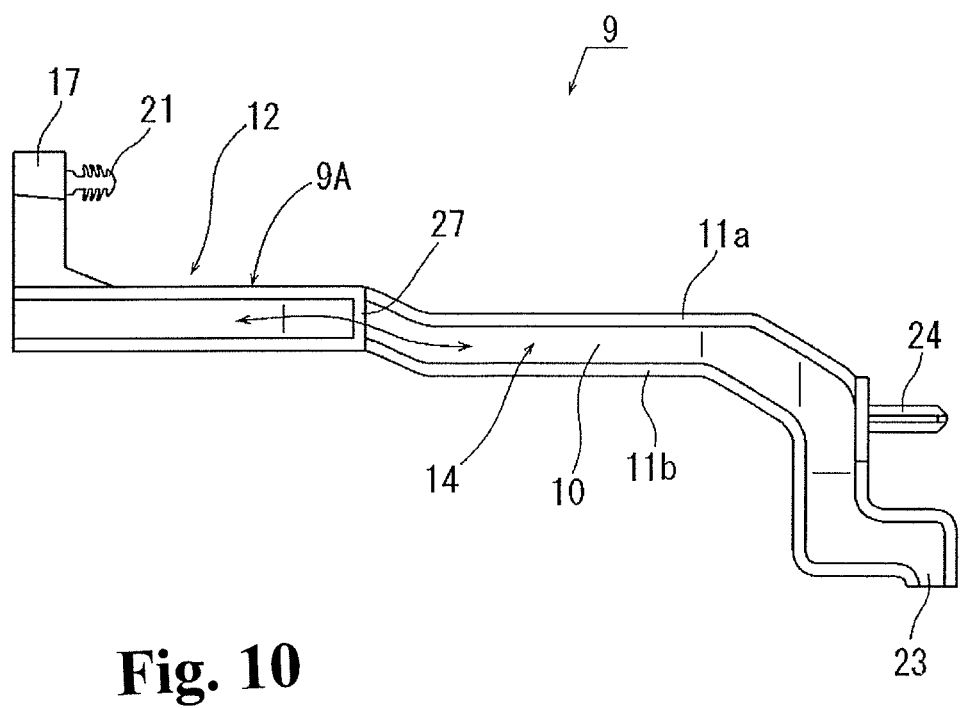
FIG. 10 is a plan view illustrating a modified example of the oil path 9.
Figure 11:
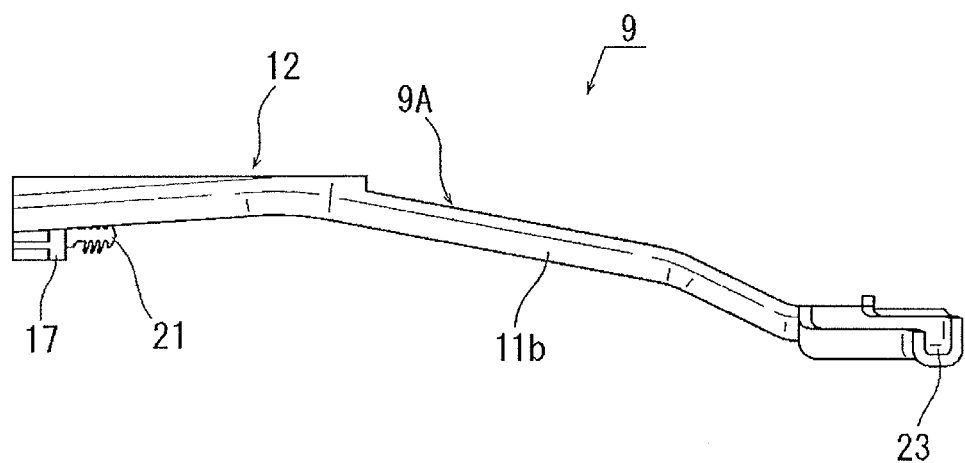
FIG. 11 is a left side view illustrating a modified example of the oil path 9.

FIGS. 9 to 11 illustrate a modified example of the oil path 9. The same constituent elements as in the above-mentioned embodiment example are assigned the same reference numerals, and their descriptions are omitted.

The oil path 9 illustrated in FIGS. 9 to 11 is a modified example that is changed in correspondence with the lubricated parts to which the collected lubricating oil is guided, and the basic structure is the same as that of the oil path 9 according to the abovementioned embodiment.

In the present modified example, both ends in the long direction of the channel of the oil path 9 are open, and a dam part 27 is provided at midcourse of the channel of the oil path 9. Therefore, the lubricating oil collected in the oil path 9 is diverted by the dam part 27 as illustrated by the arrow in FIG. 10, and each diverted flow comes to flow down to the outside from both ends in the long direction of the oil path.

An embodiment of the present invention was described above, but the present invention is not limited to the above-mentioned embodiment; for example, the following modes are included:

(1) a mode in which a first held part is made as a press-in hole and a holding part formed on an open side end face of the transmission case 4 is made as a press-in pin part (press-in projection) for pressing into the press-in hole;

(2) a mode in which a recess is formed on an open side end face of the transmission case 4, a press-in pin part (press-in projection) is placed standing up inside the recess as a holding part (holding part formed on the open side end face of the transmission case 4), and a pair of holding boards inserted inside the recess for pressing the press-in pin part therein is formed as a first held part, or a mode in which such configuration is reversed in the relationship between the holding part and the first held part;

(3) a mode in which a second held part is made as an insertion hole and a holding part formed for fixing in position on a bottom part side of the transmission case 4 is made as an insertion pin part (insertion projection);

(4) a mode in which a holding part formed for fixing in position on a bottom part side of the transmission case 4 is made as a recess formed with a step part on an inner wall of the transmission case 4, and a second held part is made as an insertion pin part 24 positioned (placed) in the recess, or a mode in which such configuration is reversed in the relationship between the holding part and the first held part; and (5) in the abovementioned embodiment, the insertion pin part 24 is inserted in a freely fitted state into the insertion hole 25.

The present application is based on a Japanese Patent Application (Patent Application No. 2009-174151) filed on Jul. 27, 2009, and the contents thereof are incorporated by reference herein.

EXPLANATION OF THE REFERENCE NUMERALS

1: Engine
2: Clutch
3: Transmission
4: Transmission case
5: Clutch case
6: Serial gear group
7: Differential gear
8*a*, 8*b*: Drive shaft
9: Oil path (lubricating oil collecting and guiding device)
9A: Main unit
10: Bottom wall part
11*a*, 11*b*: Side wall part
12: Lubricating oil collecting part
13: Flow-out part
14: Channel part
15: Opening
16: Cutout part
17: First support part (support part)
21: Press-in pin part (first held part, press-in projection)
22: Press-in hole (holding part formed on open side end face of transmission case)
24: Insertion pin part (second held part, insertion projection)
25: Insertion hole (holding part formed for fixing in position on bottom part side of transmission case)

What is claimed is:

1. A lubricating oil collecting and guiding device for collecting lubricating oil inside a transmission case and guiding the collected lubricating oil to lubrication parts inside the transmission case, comprising:

an elongated gutter-shaped main unit including a pair of side wall parts facing each other, and a support part extending outwardly from one of the pair of side wall parts and having a flat board-form part formed on a front side thereof and a pressing face part formed on a rear side thereof; and a plurality of held parts provided on the main unit, including a press-in projection integrally formed on the flat board-form and projecting from the flat board-form part in a direction away from the support part, the press-in projection being pressed into a press-in hole formed on an open side end face of said transmission case by pressing the pressing face part and held in a tightly fitted state, and an insertion projection freely inserted into an insertion hole formed for positioning on a bottom part side of said transmission case and held in a loosely fitted state;

wherein the main unit is adapted to be placed above a serial gear group received inside the transmission case having a bottomed cylindrical shape when the plurality of held parts is held on the transmission case, and said insertion projection has a projection length from said main unit longer than that of said press-in projection from said main unit, and said insertion projection has an insertion length inserted into said insertion hole longer than that of said press-in projection inserted into said press-in hole in an installed state, wherein the press-in projection has a shaft part, and wing parts radially outwardly extending from an outer perimeter portion of the shaft part and having a diameter larger than that of the press-in hole; and the insertion projection has a center portion, and wing parts outwardly extending from the center portion to form a cross shape and having a diameter smaller than that of the insertion hole.

2. A lubricating oil collecting and guiding device according to claim 1, wherein the support part is provided on one end in an elongated direction of said main unit.

3. A lubricating oil collecting and guiding device according to claim 2, wherein the pressing face part is formed to align in one plane with the one end of said main unit.

4. A lubricating oil collecting and guiding device according to claim 1, wherein said press-in projection has a brush clip shape.

5. A combination comprising:
the lubricating oil collecting and guiding device according to claim 1, and the transmission case including the press-in hole formed on the open side end face thereof and the positioning insertion hole formed on the bottom part side thereof.

6. A lubricating oil collecting and guiding device for collecting lubricating oil inside a transmission case and guiding the collected lubricating oil to lubrication parts inside the transmission case, comprising:
   an elongated gutter-shaped main unit; and
   a plurality of held parts provided on the main unit, including a press-in projection pressed into a press-in hole formed on an open side end face of said transmission case and held in a tightly fitted state, and an insertion projection freely inserted into an insertion hole formed for positioning on a bottom part side of said transmission case and held in a loosely fitted state;
   wherein the main unit is adapted to be placed above a serial gear group received inside the transmission case having a bottomed cylindrical shape when the plurality of held parts is held on the transmission case;
   said insertion projection has a projection length from said main unit longer than that of said press-in projection from said main unit, and said insertion projection has an insertion length inserted into said insertion hole longer than that of said press-in projection inserted into said press-in hole in an installed state;
   the main unit includes a screen board integrally formed on one end in an elongated direction of the main unit and a first support part extending outwardly from the screen board in a direction same as that of the screen board;
   the first support part includes a flat board-form part formed on a front side thereof, and lattice-form rib parts having a horizontal row and vertical rows intersecting to the horizontal row and formed on a back side thereof; and
   the press-in projection projects from the flat board-form part in a direction away from the first support part.

7. A lubricating oil collecting and guiding device according to claim 6, wherein the main unit includes a second support part integrally formed on a middle portion in the elongated direction of the main unit and extending outwardly in a direction opposite to the extending direction of the first support part, and the second support part includes a front face; and
   the insertion projection projects from the front face in a direction away from the second support part.

* * * * *